United States Patent [19]
Chern

[11] Patent Number: 5,309,368
[45] Date of Patent: May 3, 1994

[54] WORKPIECE HANDLING MECHANISM OF A C-N-C LATHE MACHINE

[76] Inventor: Shyi-Tsae Chern, No. 57, Hua-Fu St., Taichung City, Taiwan

[21] Appl. No.: 823,132

[22] Filed: Jan. 21, 1992

[51] Int. Cl.$^5$ .................. G06F 15/46; B23B 13/00; B23B 15/00
[52] U.S. Cl. .................. 364/474.21; 483/14; 82/118; 82/125
[58] Field of Search .................. 364/474.21, 478, 479; 82/118, 120, 125, 124, 126, 127; 483/14; 901/7

[56] References Cited

U.S. PATENT DOCUMENTS

| | | | |
|---|---|---|---|
| 4,359,815 | 11/1982 | Toyoda | 483/14 |
| 4,646,422 | 3/1987 | McMurtry | 82/125 |
| 4,926,723 | 5/1990 | Lothammer | 82/120 |
| 5,020,201 | 6/1991 | Kitamura | 82/120 |
| 5,153,973 | 10/1992 | Kitamura | 82/125 |

FOREIGN PATENT DOCUMENTS 56-134102 10/1981 Japan ........................ 82/124

*Primary Examiner*—Jerry Smith
*Assistant Examiner*—Steven R. Garland
*Attorney, Agent, or Firm*—Ostrolenk, Faber, Gerb & Soffen

[57] ABSTRACT

The workpiece handling device includes a workpiece carrying arm and a workpiece support spaced from the lathe machine on which the workpiece carrying arm is pivotally provided. The workpiece carrying arm includes a gripping unit for holding the workpiece thereon. The workpiece carrying arm can turn within a 180 degree range.

4 Claims, 7 Drawing Sheets

WORKPIECE HANDLING MECHANISM OF A C-N-C LATHE MACHINE

BACKGROUND OF THE INVENTION

1. Field of the Invention

The invention relates to a workpiece handling device, more particularly to a workpiece handling device of a computer numerical control lathe machine.

2. Description of the Related Art

C-N-C lathes (computer control lathes) are well known in the art and are used to shape a large volume of workpieces. Because the C-N-C lathes are expensive, they are not normally used to shape a small volume of workpieces. As shown in FIG. 1, in a portable lathe used to cut a small volume of workpieces, only the cutting process is automatically controlled. Heretofore, the processes of placing the workpieces into a chuck, tightening and loosening the chuck, and discharging the workpieces from the chuck are automatically controlled by a specially designed robot (2). Since the construction cost of such a robot is tremendously high, buying such a robot and using it in a C-N-C lathe machine is a great financial burden for an ordinary mechanic.

SUMMARY OF THE INVENTION

The main object of the present invention is to provide a workpiece handling device to be attached to the above-mentioned C-N-C lathe machine so that the overall cost of the machine will be reduced.

According to the present invention, a C-N-C lathe machine includes a machine body which has a first motor with a main shaft mounted thereon. A hydraulically operated chuck is provided at one end of the main shaft. A second motor and a first screw shaft are mounted on the machine body parallel to the main shaft. The first screw shaft is driven by the second motor. A first carriage is mounted on the machine body and is moved by the first screw shaft towards and away from the hydraulic chuck. A second carriage is mounted on the first carriage with a third motor. A cutting device is movably mounted on the second carriage and is driven by the third motor to move the cutting device forward and backward in a direction perpendicular to the first screw shaft. A hydraulic control system controls the movements of the hydraulic operated chuck and the cutting device. An electric control system includes a programmable control panel having a display member and receiving a plurality of pre-fed instructions to permit automatic control of the operations of the lathe machine. The C-N-C lathe machine further includes a workpiece handling device comprising a workpiece carrying arm provided on the second carriage and a workpiece support provided adjacent to the machine body and which workpiece support has a rotary disk to hold a plurality of workpieces thereon. During operation, the workpieces are placed in the workpiece support, held in the chuck, cut by the cutting device, loosened from the chuck, and discharged from the chuck into the workpiece support automatically by the workpiece carriage arm.

BRIEF DESCRIPTION OF THE DRAWINGS

Other features and advantages of the present invention will become apparent in the following detailed description, including drawings, all of which show a non-limiting form of the present invention, and in which.

DETAILED DESCRIPTION OF THE PREFERRED EMBODIMENT

Figure 1:
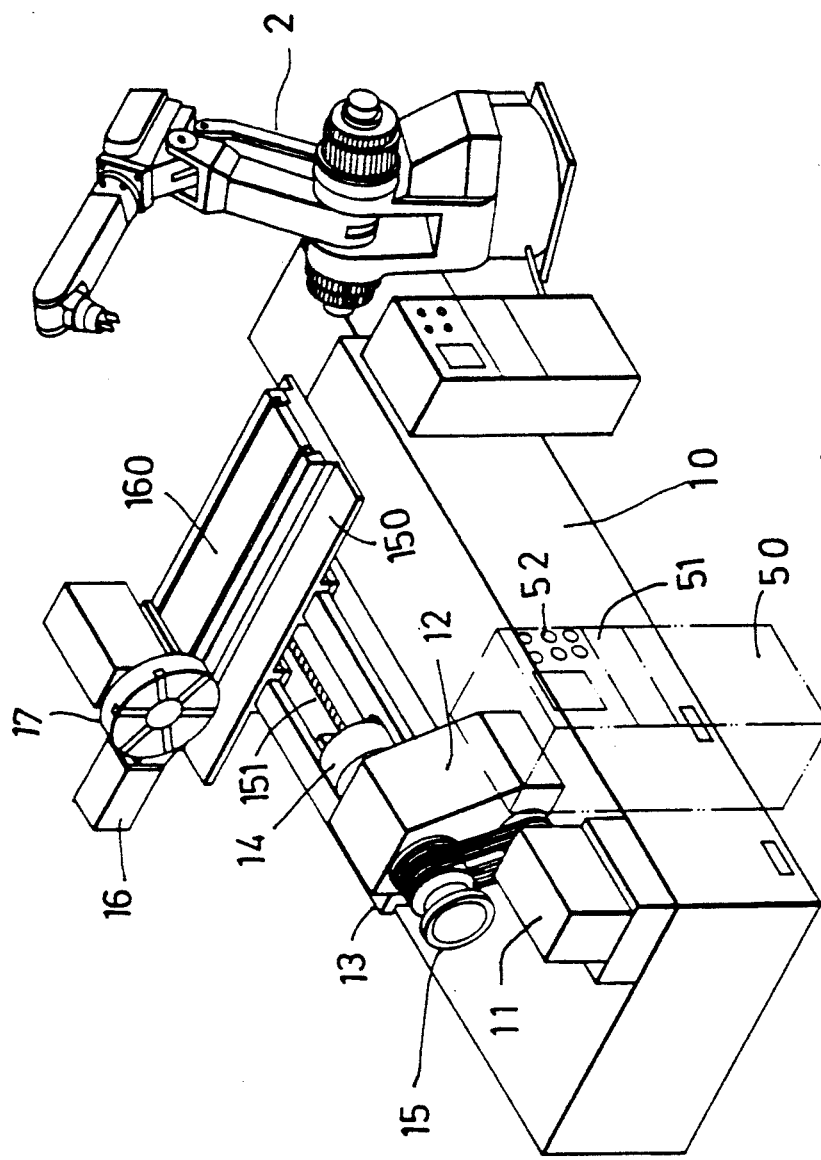
FIG. 1 is a computer numerical control lathe machine which uses a robot for handling workpieces according to the prior art.

Referring to FIG. 1, a computer numerical control lathe machine of the prior art comprises a machine body (10) which has a first servo-motor (11) for driving a main shaft (13) which is rotatably mounted on a fixing seat (12) on the machine body. A hydraulically operated chuck (14) is provided at one end of the main shaft (13). A second servo-motor (15) and a first screw shaft (151) are also mounted on the machine body (10) parallel to the main shaft (13). The first screw shaft (151) is driven by the second servomotor (15).

A first carriage (150) is mounted on the machine body (10) and is moved by the first screw shaft (151) towards and away from the hydraulic chuck (14). A second carriage (160) and a third servo-motor (16) are mounted on the machine body (10). A cutting device (17) is movably mounted on the second carriage (160). A second screw shaft (not shown) is mounted on the second carriage (160) for moving the cutting device (17) forward and backward in a direction perpendicular to the first screw shaft (151).

A hydraulic control system (40) controls the movements of the hydraulic operated chuck (14) and the cutting device (17). An electric control system (50) includes a programmable control panel (51) having a display member (52) and receives a plurality of pre-fed instructions to permit automatic control of the overall working operations of the lathe machine.

Figure 2:
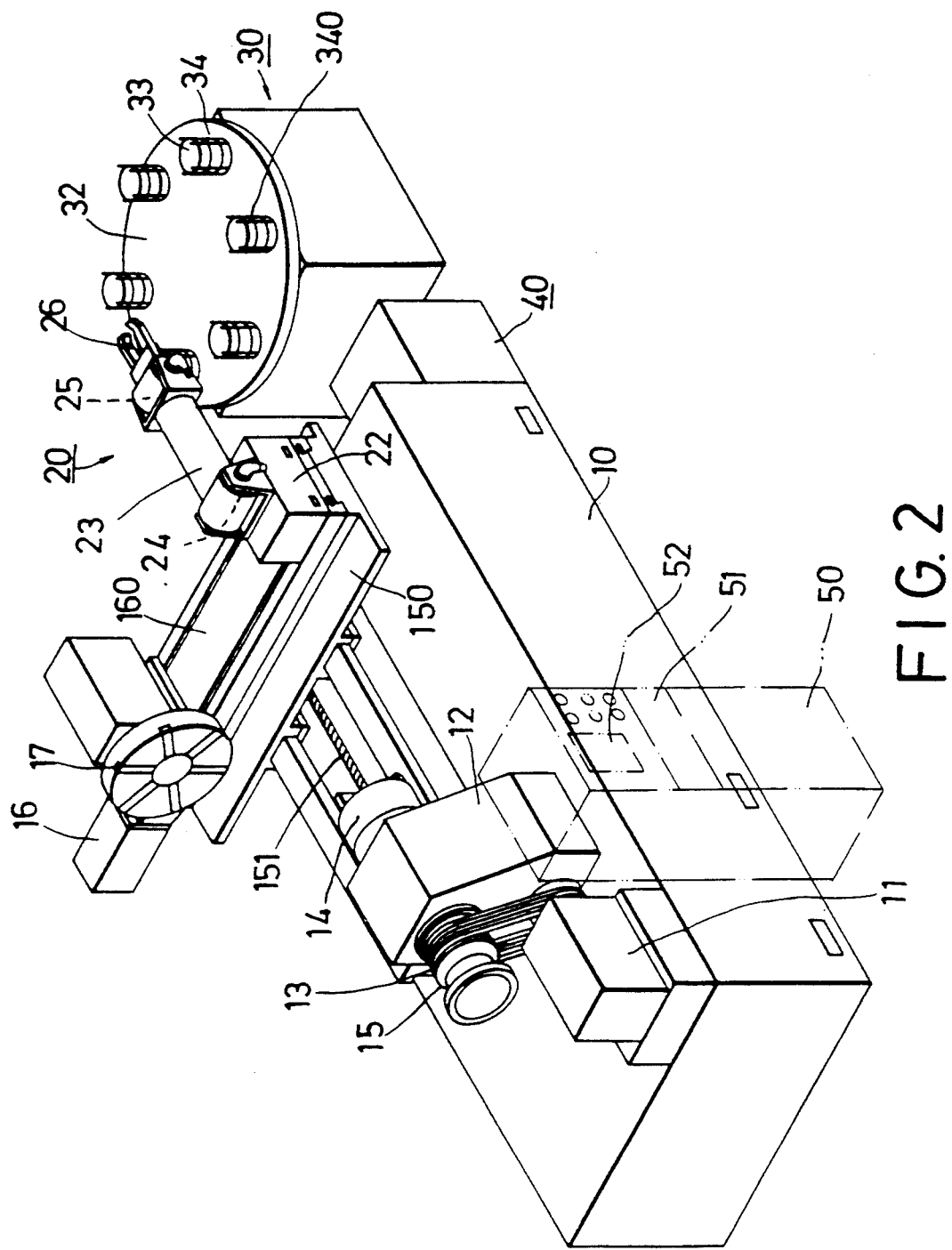
FIG. 2 shows a computer numerical control lathe machine of FIG. 1 to which a workpiece handling device of the present invention is attached.
Figure 3:
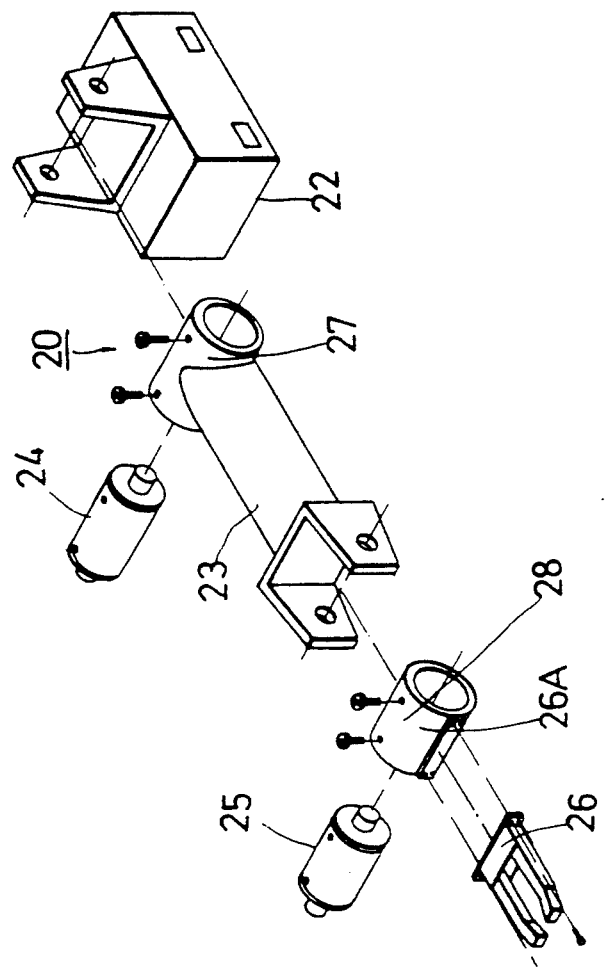
FIG. 3 shows an exploded view of the workpiece handling device of the present invention.
Figure 4:
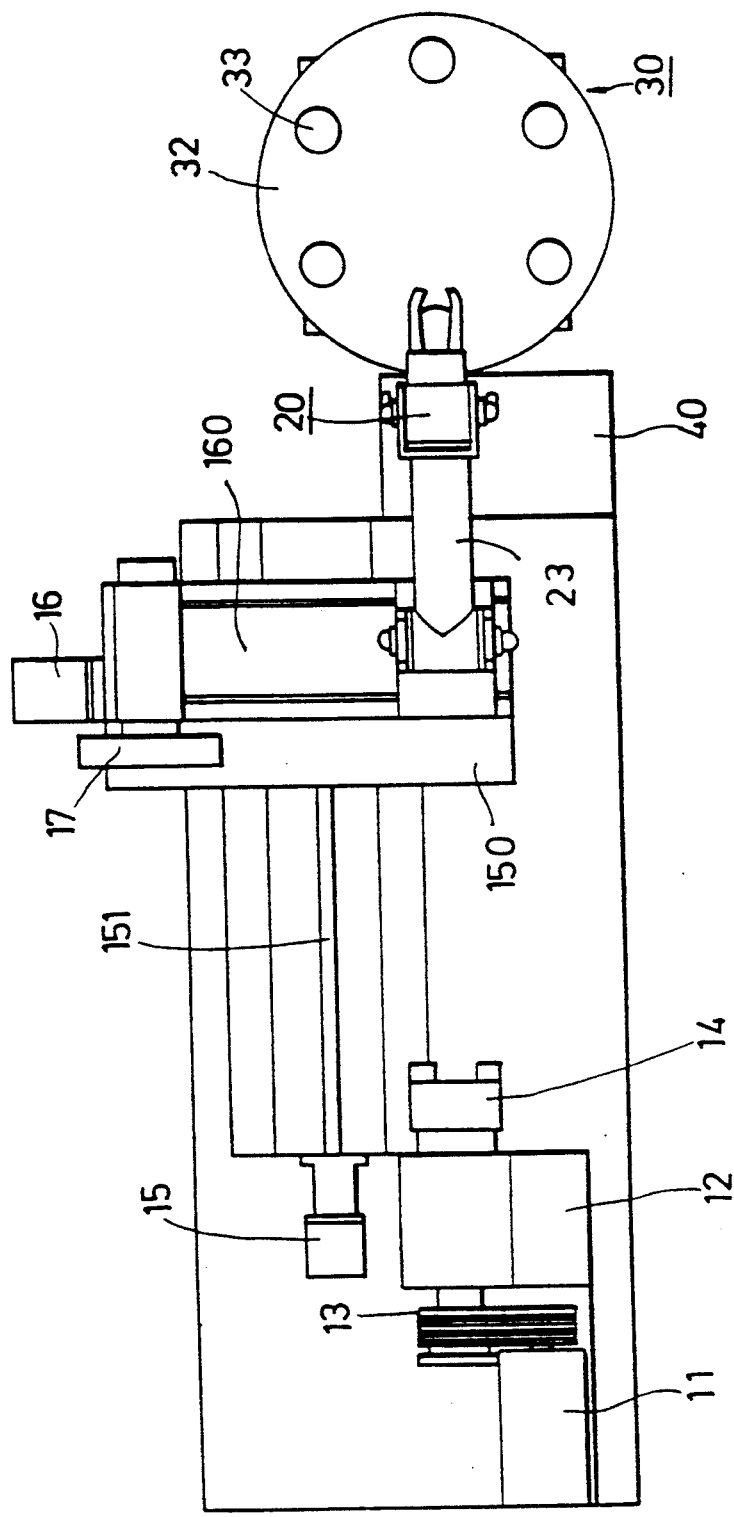
FIG. 4 is top view of the computer numerical control lathe machine of FIG. 2.
Figure 5:
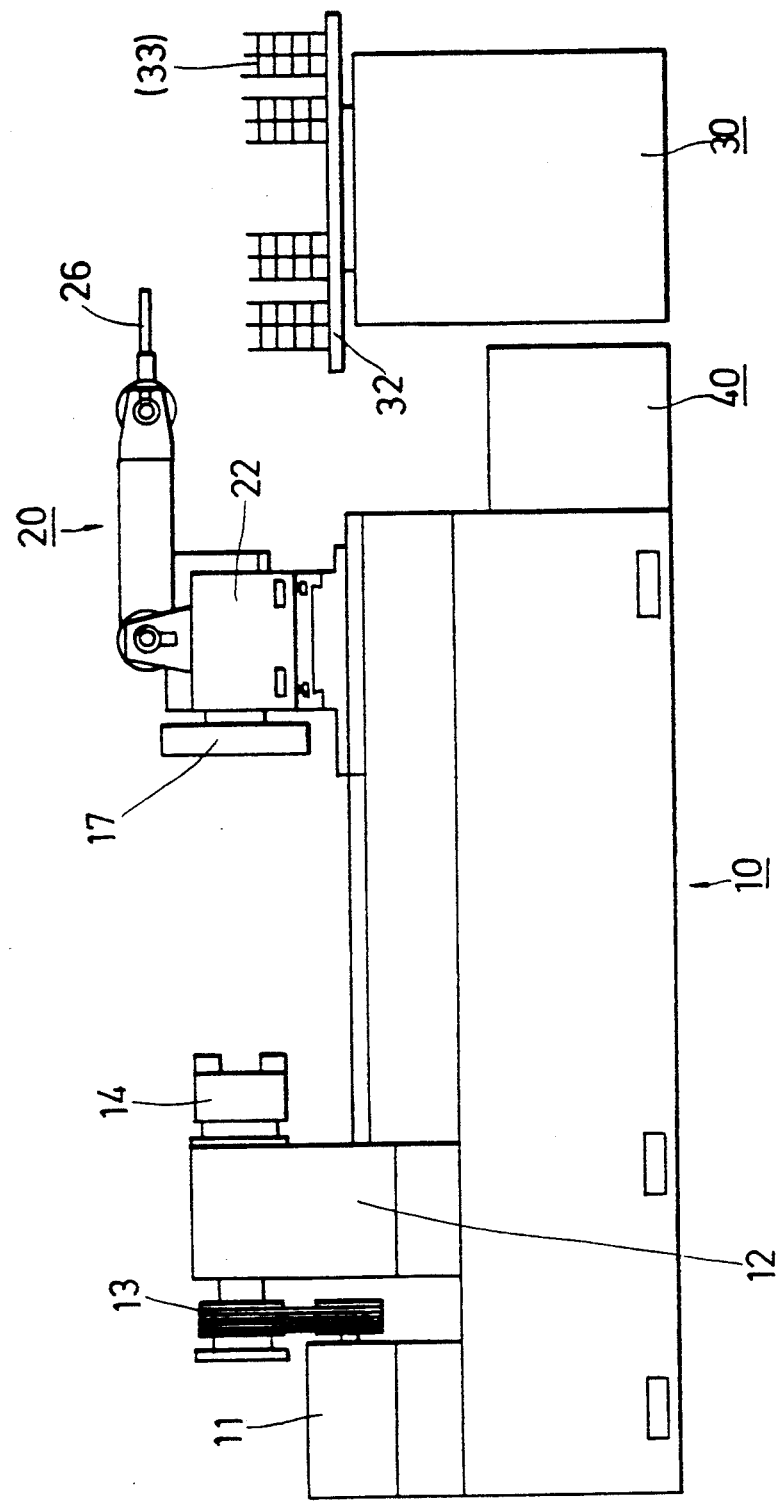
FIG. 5 shows a side view of the computer numerical control lathe machine of FIG. 2.
Figure 6:
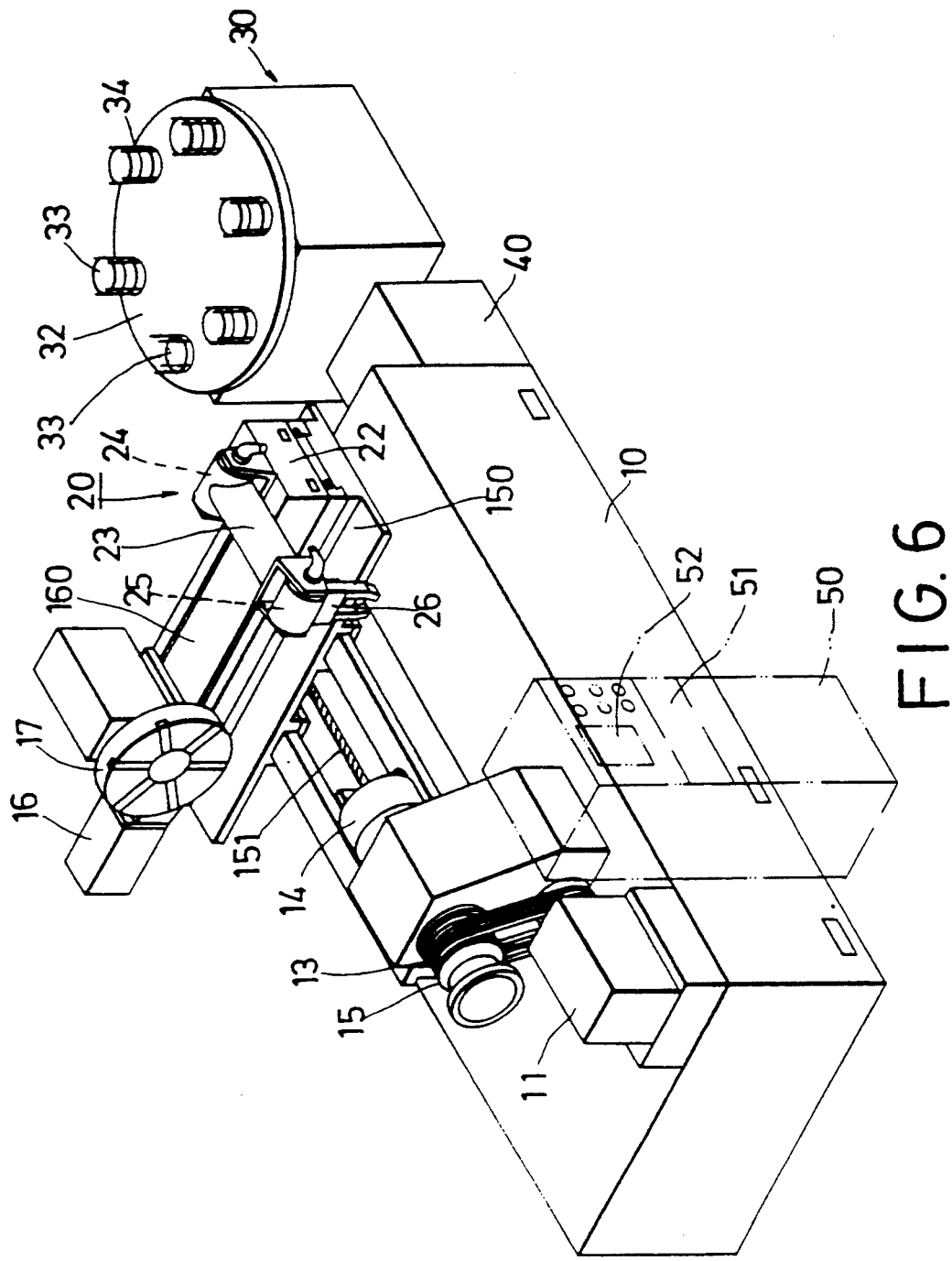
FIG. 6 shows the C-N-C lathe machine with the workpiece handling device of the present invention in operation.
Figure 7:
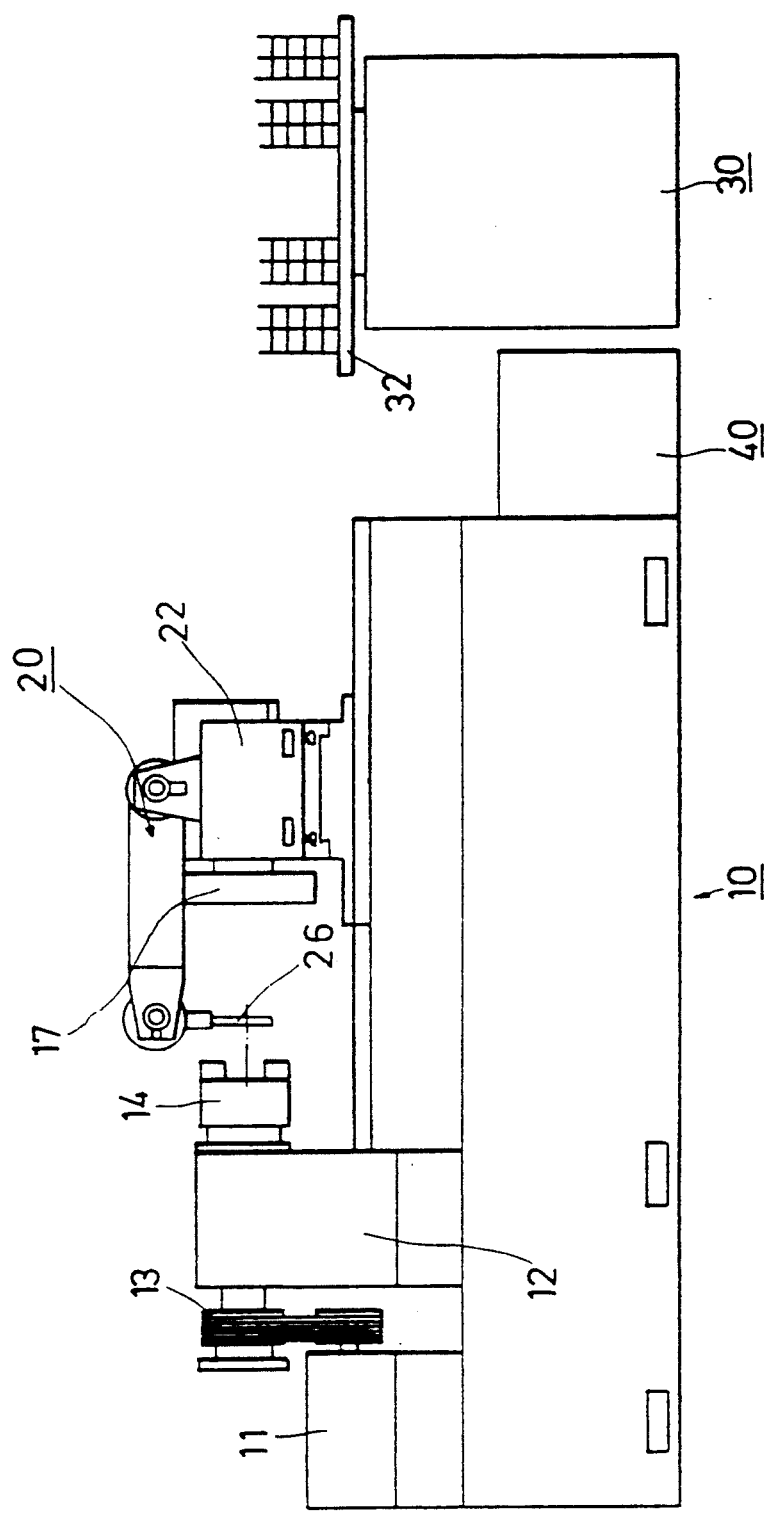
FIG. 7 is a side view of the C-N-C lathe machine of FIG. 6 in operation from a different view.

According to the present invention, a workpiece handling device (20) is attached to the above-mentioned C-N-C lathe machine. As shown in FIGS. 2 and 3, the workpiece handling device (20) is pivotally provided on the fixing seat (22) of the second carriage (160). The device (20) includes a workpiece carrying arm (23) having a first end with a cylinder member (27) pivotally attached to the fixing seat (22). A first hydraulically operated rotary member (24) extends into the cylinder member (27). Another cylinder member (28) is pivotally provided on the second end of the workpiece carrying arm (23). A second hydraulically operated rotary member (25) is sleeved in the cylinder member (28). The cylinder (28) has a gripping member (26) having a pair of clamping claws for holding a workpiece (33) therebetween. The handling device (20) further includes a workpiece support (30) that has a rotary disk (32) for holding a plurality of workpieces (33) thereon. The rotation, raising and lowering of the rotary disk are necessary in order to enable the gripping member (26) of the workpiece carrying arm (23) to remove the workpieces therefrom, are preset and. Since achievement of such movements are known in this field, a detailed clarification of the same is omitted here. The angular rotation of the workpiece carrying arm (23) is also known in the field. Therefore, a detailed description of how such an action is accomplished is also omitted. Once the C-N-C lathe machine is in operation, the workpieces (33) held in a rack (34) of the rotary disk (32) are automatically placed by the workpiece carrying arm (23) into the hydraulically operated chuck (14). The chuck (14) automatically holds the workpiece (33) while the first carriage (150) moves toward the same, so as to permit automatic machining by the cutting device (17). The finished workpiece (33) is automatically discharged back into a emptied rack (34') of the rotary disk (32) by the workpiece carrying arm (23), until all the workpieces (33) on the disk become finished workpieces (33) as shown in FIG. 5. In the present preferred embodiment, the workpiece carrying arm (23) is made in such a way that it can turn within a 180 degree range. FIGS. 6 and 7 respectively show the C-N-C lathe machine equipped with the workpiece handling device of the present invention when in operation.

To summarize, the present invention uses all the known art in the related field, so that the construction cost is greatly reduced. A C-N-C lathe machine equipped with such a device can accomplish its operation as effectively as using a high cost robot for handling workpieces.

With the invention thus explained, it is obvious to those skilled in the art that various modifications and variations can be made without departing from the scope and spirit of the present invention. It is therefore intended that this invention be limited only as in the appended claims.

I claim:

1. A workpiece handling mechanism for a computer numerical control lathe machine, said lathe machine including a machine body which has a first motor and a main shaft mounted thereon, a hydraulically operated chuck provided at one end of said main shaft for holding a workpiece, a second motor and a first screw shaft mounted on said machine body parallel to said main shaft, said first screw shaft being driven by said second motor, a first carriage mounted on said machine body and moved by said first screw shaft towards and away from said hydraulic chuck, a second carriage mounted on said first carriage, said second carriage including a third motor, a cutting device being mounted on said second carriage for cutting the workpiece, a second screw shaft mounted on said second carriage and driven by said third motor to move said cutting device forward and backward in a direction perpendicular to said first screw shaft, a hydraulic control system for controlling the operations of said hydraulic operated chuck and said cutting device, an electric control system including a programmable control panel having a display member and, said control panel receiving a plurality of pre-fed instructions to permit automatic control of the operation of said lathe machine, said workpiece handling mechanism comprising:

a workpiece carrying arm mounted on said second carriage; and a workpiece support spaced from said machine body and adjacent to said workpiece carrying arm, said workpiece support having a rotary disk for holding a plurality of workpieces;

wherein said workpiece is automatically removed from said rotary disk of said workpiece support by said workpiece carrying arm and placed into said chuck, said workpiece is automatically cut by said cutting device while being held in said chuck, and, after being cut, said workpiece is automatically discharged from said chuck and placed into said workpiece support by said workpiece carrying arm.

2. A workpiece handling mechanism as claimed in claim 1, wherein said workpiece carrying arm includes a first hydraulic rotary member mounted on said second carriage, an arm having one end connected to said first rotary member, a second hydraulic rotary member mounted on the other end of said arm, and a turnable grip member connected to said second rotary member.

3. A workpiece handling mechanism as claimed in claim 1, wherein said rotary disk has a plurality of spaced racks each receiving a plurality of workpieces.

4. A workpiece handling mechanism as claimed in claim 1, wherein said grip member has at least two clamping prongs.

* * * * *